(12) United States Patent
Tohta (10) Patent No.: US 9,188,602 B2
(45) Date of Patent: Nov. 17, 2015

(54) ACCELERATION DETECTION DEVICE (75) Inventor: Yuzuru Tohta, Sagamihara (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 325 days.

(21) Appl. No.: 13/877,366

(22) PCT Filed: Aug. 3, 2011

(86) PCT No.: PCT/JP2011/067727
§ 371 (c)(1),
(2), (4) Date: Apr. 2, 2013

(87) PCT Pub. No.: WO2012/046497
PCT Pub. Date: Apr. 12, 2012

(65) Prior Publication Data
US 2013/0192333 A1 Aug. 1, 2013

(30) Foreign Application Priority Data

Oct. 5, 2010 (JP) .................................. 2010-225352

(51) Int. Cl.
G01P 15/00 (2006.01)
G01P 21/00 (2006.01)
(52) U.S. Cl.
CPC ............. G01P 21/00 (2013.01); B60T 2230/04 (2013.01); B60T 2250/06 (2013.01)
(58) Field of Classification Search
CPC .................................................. G60T 2250/06
See application file for complete search history.

(56) References Cited

U.S. PATENT DOCUMENTS 8,340,860 B2 * 12/2012 Kobayashi et al. .......... 701/30.8
2010/0191494 A1 7/2010 Yamashita

FOREIGN PATENT DOCUMENTS

| EP | 1930731 A2 | 6/2008 |
| EP | 1930733 A1 | 6/2008 |
| JP | 63-134319 A | 6/1988 |
| JP | 07-159438 A | 6/1995 |
| JP | 07-301641 A | 11/1995 |
| JP | 2005-181254 A | 7/2005 |
| JP | 2005181254 A | 7/2005 |
| JP | 2008-145151 A | 6/2008 |
| WO | 2009031256 A1 | 3/2009 |

OTHER PUBLICATIONS

Russian Federation Official Action dated Jul. 16, 2014 for the corresponding Russian Application No. 2013120073/11 (029690).
European Patent Office Communication Pursuant to Article 94(3) EPC dated Oct. 22, 2014, from the corresponding European Patent Application No. 11830430.2-1558.
Extended European Search Report, dated Mar. 19, 2014, from the corresponding European Application No. 11830430.2.

* cited by examiner

Primary Examiner — Harshad R Patel
Assistant Examiner — Tran M Tran
(74) Attorney, Agent, or Firm — Young Basile Hanlon & MacFarlane, P.C.

(57) ABSTRACT

An acceleration detection device is provided with a zero point correction unit for correcting a zero point position of a sensor signal value by using the correction amount (absolute value of a correction value) based on the acceleration when the vehicle transitions from a stopped state on a sloping road to a running state. The acceleration detection device is also provided with a correction amount restriction unit for restricting the correction amount, thereby suppressing calculation of an excessive correction amount due to road surface irregularities or movement of the occupant and deterioration in correction accuracy.

6 Claims, 9 Drawing Sheets

ACCELERATION DETECTION DEVICE

TECHNICAL FIELD

The present disclosure relates to an acceleration detection device.

BACKGROUND

In the conventional acceleration detection device, based on an acceleration sensor signal of a vehicle in a stopped or stationary state and the other acceleration sensor signal in a transition state in which the vehicle transitions from the stationary state to running state, a drift error due to temperature change or aging is calculated for use in a zero point correction of the acceleration sensor. An example of such technique related to this description is disclosed in Japanese Laid-Open Patent Application Publication No. 2008-145151.

BRIEF SUMMARY

However, in the example described above, the acceleration signal detected during the transition from the stationary state to the running state includes a vehicle body vibration component due to an uneven road or movement of the occupant in vehicle. Thus, an excessive correction amount is inclined to be calculated, which would lead to the problem of deterioration in the correction accuracy. The teachings herein are intended to provide an acceleration detection device that may suppress deterioration in the correction accuracy.

According to the teachings herein, when correcting a zero position of the acceleration sensor by the correction amount based on the acceleration sensor signal at the transitional state from the stopped state to the running state, the correction amount will be restricted or limited.

By restricting or limiting the correction amount, calculation of an excessive correction amount due to road surface irregularities or movement of the occupant will be suppressed and deterioration in correction accuracy may be inhibited.

BRIEF DESCRIPTION OF THE DRAWINGS

The description herein makes reference to the accompanying drawings wherein like reference numerals refer to like parts throughout the several views, and wherein.

DETAILED DESCRIPTION

In the following, description will be made of a configuration for carrying out the acceleration detection device according to the present invention based on the embodiments.

Figure 1:
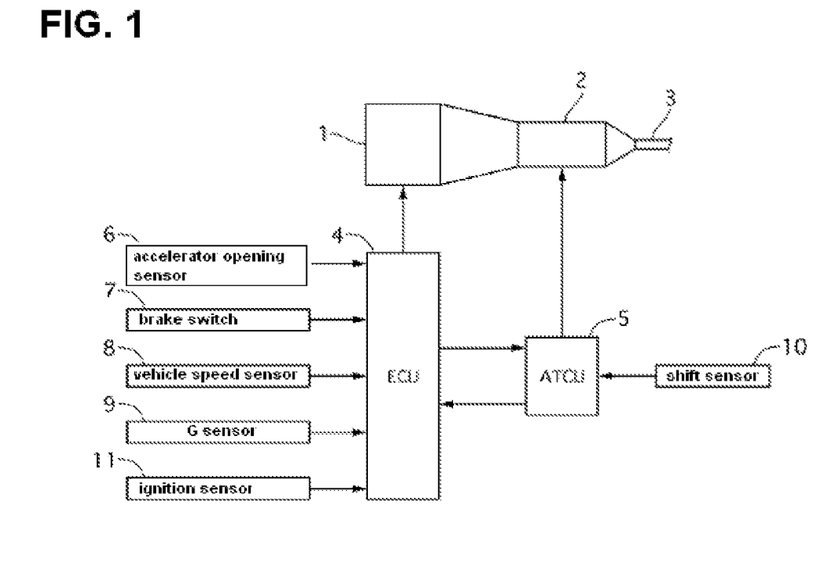
FIG. 1 is a schematic system diagram of a neutral control device equipped with an acceleration detection device in accordance with a first embodiment.

Referring to FIG. 1, a system diagram is illustrated, to which an acceleration detection device of the first embodiment is applied. The output of engine 1 is, after a prescribed change by automatic transmission 2 connected to engine 1, outputted from output shaft 3 to driving wheels not shown. The vehicle is equipped with engine controller (ECU) 4 and automatic transmission controller (ATCU) 5 for controlling engine 1 and automatic transmission 2 respectively based on output signals of various sensors and the like described below. Both controllers 4, 5 are able to communicate to each other.

The vehicle is mounted with various sensors such as an accelerator opening sensor 6, brake switch 7, vehicle speed sensor 8, acceleration sensor (G sensor) 10, shift sensor 10, and ignition sensor 11.

The accelerator opening sensor 6 detects an accelerator opening and outputs the accelerator opening signal to ECU 4. Brake switch 7 outputs a brake switch signal to ECU 4 indicating ON when the brake pedal is depressed, and OFF when the brake pedal is not being depressed. The vehicle speed sensor 8 detects a running speed (vehicle speed) of vehicle based on rotation angle of each wheel detected by a wheel speed sensor mounted to each wheel, and outputs a vehicle speed signal to ECU 4. The G sensor 9 detects longitudinal acceleration acting on the vehicle and outputs a G sensor signal to ECU 4. The shift sensor 10 detects a shift position of automatic transmission 2 and outputs a shift position signal to ATCU 5. The ignition sensor 11 outputs an ignition signal to ECU 4, which indicates ON when an ignition switch is turned ON, while OFF when the ignition is turned OFF.

ECU 4 outputs a request to ATCU 5 for releasing a clutch (staring clutch) of automatic transmission 2, which is engaged at the time of vehicle start, thereby carrying out a neutral control in a neutral state in which driving force transmission to driving wheels is disconnected, when the shift position of automatic transmission 2 is in a forward travel or drive position, the vehicle is held in a stopped state or stationary state by brake without depressing on accelerator pedal, and a sloping road ramp is less than a predetermined angle (5% or less for both ascending and descending roads).

In other words, ECU 4 will perform a neutral control provided that the shift position signal from the shift sensor 10 indicates a forward drive position, that the accelerator opening signal of the accelerator opening sensor 6 is zero, that the brake switch signal from the brake switch 7 is ON, that the vehicle speed signal from the vehicle speed sensor 8 is a prescribed value ($\approx 0$), and that the acceleration signal from the G sensor 9 indicates an acceleration that corresponds to a sloping road of the prescribed angle of 5 [%] or less. At the point in time in which any of the above-described conditions for execution of neutral control is no longer met, such as the brake switch going OFF, ECU 4 will end the neutral control and send a request to ATCU 5 to engage the starting clutch of automatic transmission 2.

Figure 2:
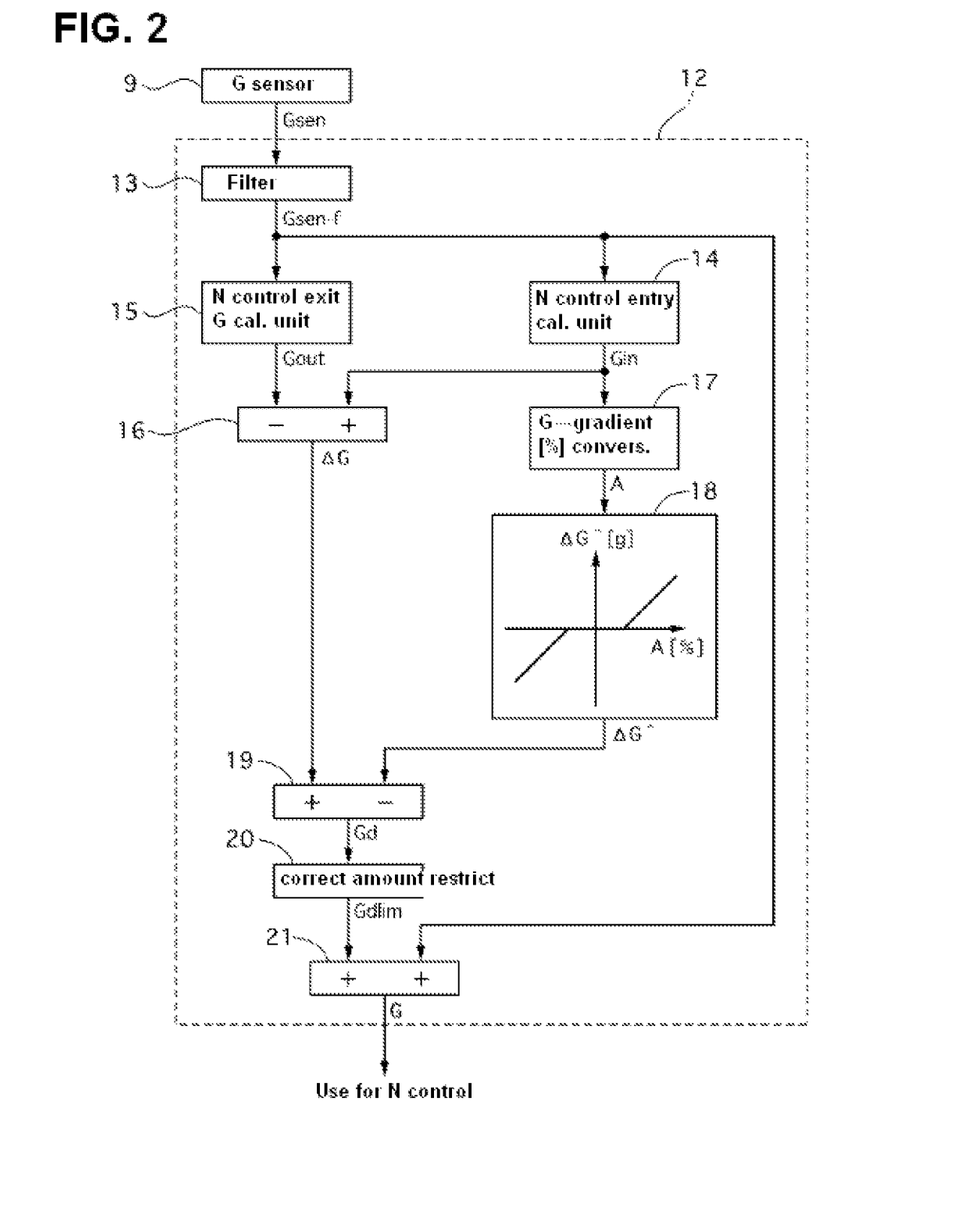
FIG. 2 is a control block diagram depicting a configuration of the acceleration detection device 12 housed in ECU 4 of the first embodiment.

FIG. 2 is a control block diagram depicting a configuration of the acceleration detection device 12 housed in ECU 4, and the acceleration detection device 12 of the first embodiment 1 is provided with a filter 13, an N control entry G calculating unit 14, an N control exit G calculating unit 15, a ΔG calculation unit 16, a G→gradient or ramp conversion unit 17, a ΔG estimation unit 18, a correction amount calculation unit 19, a correction amount restriction or limit unit (correction amount limiting means) 20, and a zero point correction unit (zero point correcting means) 21.

The filter 13 removes a noise component included in G sensor signal (about a range between 20 and 30 Hz) Gsen [g].

The N control entry G calculation unit 14 calculates an acceleration Gin [g] at the N control entry based on G sensor signal Gsen-f after passing through the filter 13 after a predetermined time has elapsed from the start of the neutral control. Note that the predetermined time is the time in which the vehicle vibration generating during stopping operation is sufficiently converged and G sensor Gsen is thereby estimated not to include the vehicle body vibration component associated with the vehicle stop.

The N control exit or digress G calculation unit 15 calculates, based on the G sensor signal Gsen-f passing through filter 13 from the time at the end of the neutral control up to start of driving force transmission to driving wheels in response to the starting clutch engagement in automatic transmission 2, an acceleration Gout [g] at the N control exit that presents the farthest gap from the N control entry acceleration Gin.

More specifically, the N control exit acceleration Gout is representative of a maximum absolute value of acceleration occurring due to a vehicle rollback immediately after completion of the neutral control that has been in place on a sloping road with a predetermined ramp gradient or more.

The ΔG calculation unit 16 calculates an acceleration change amount detection ΔG [g] by subtracting the N control exit acceleration Gout calculated by N control exit G calculation unit 15 from N control entry acceleration Gin calculated by N control entry G calculation unit 14.

The G→gradient conversion unit 17 converts the N control entry acceleration Gin calculated by N control entry G calculation unit 14 into a gradient A % of road surface. In the first embodiment, the gradient for an uphill or ascending road is indicated by positive (+) while that for a downhill or descending slop by negative (−).

The ΔG estimation unit 18 calculates, based on the gradient of road surface A [%] obtained in G→gradient conversion unit 17 and by referring to the gradient-acceleration change amount calculation map, an acceleration change estimate ΔG^[g]. The relationship between the road gradient and the acceleration change of vehicle that occurs due to vehicle rollback at the completion of N control remains the same for the same vehicle. Therefore, the gradient-acceleration change calculation map may be obtained in advance by experiments and the like.

The correction amount calculation unit 19 calculates a correction value Gd [g] by subtracting the acceleration change amount estimate ΔG^ calculated in the ΔG estimation unit 18 from the acceleration change amount detection ΔG calculated in the ΔG calculation unit 16.

The correction amount restriction or limit unit 20 calculates an after-restriction correction value Gdlim that limits the correction value Gd calculated in correction value calculation unit 19. The specific calculation method of the after-restriction correction value Gdlim is described below.

The zero point correction unit 21 calculates an acceleration detection value G that corrects the drift error of the G sensor signal Gsen by adding the after-restriction correction value Gdlim calculated in correction amount limit unit 20 to the G sensor signal Gsen-f passing through filter 13 (zero point correction). The zero point correction unit 21 updates and stores the after-restriction correction value Gdlim each time the after-restriction correction value Gdlim is calculated after ignition switch being turned off, and when ignition is turned OFF, then the stored after-restriction correction value Gdlim will be reset (=0).

As discussed above, the acceleration detection value G thus calculated is used to decide on whether or not to implement the neutral control.

Figure 3:
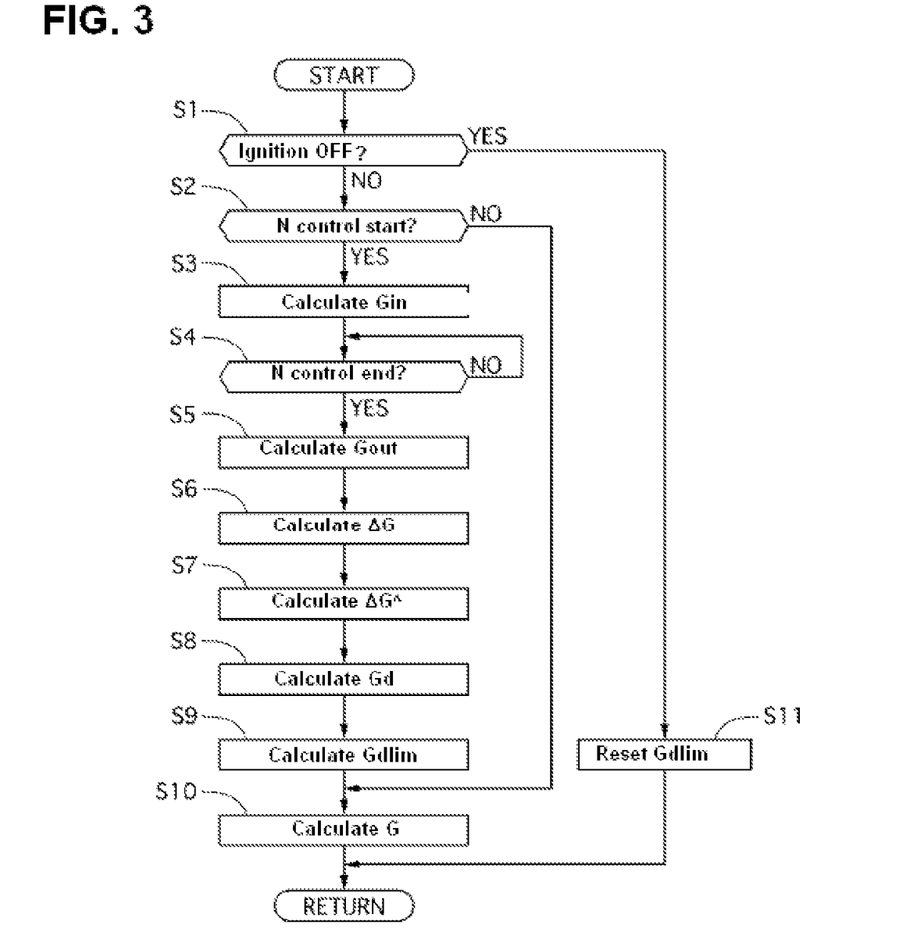
FIG. 3 is a flowchart depicting a flow of acceleration detection process executed by the acceleration detection device 12 of the first embodiment.

FIG. 3 is a flowchart showing a flow of the process to be executed by the acceleration detection device 12 of the first embodiment. A description of each step is now made. This control is executed repeatedly at a predetermined calculation period as long as the ignition is being turned ON.

In step S1, a determination is made whether or not the ignition switch has been turned OFF, and, if YES, control proceeds to step S11, and if NO, control proceeds to step S2.

In step S2, a determination is made whether or not the neutral control has been started, and, if YES, the control proceeds to step S3, while at NO determination, to step S10.

In step S3, in the N control entry G calculation unit 14, the acceleration at the N control entry Gin [g] is calculated.

In step S4, a determination is made whether or not the neutral control has been completed, if YES, control proceeds to step S5, while if NO, step S4 is repeated.

In step S5, in the N control exit G calculation unit 15, the acceleration Gout[g] at the N control exit (the neutral control exit acceleration) is calculated.

In step S6, the ΔG calculation unit 16 calculates an acceleration change amount detection ΔG [g] by subtracting the acceleration Gout at the N control exit calculated in step S5 from the acceleration Gin calculated at N control entry in step S3

In step S7, the ΔG estimation unit 18 calculates an accelerator change amount estimate ΔG^[g], based on the road surface gradient A %, which is converted by the G→gradient conversion unit 17 and by referring to the gradient-acceleration change amount calculation map.

In step S8, the correction value calculation unit 19 calculates a correction value Gd [g] by subtracting the acceleration change amount estimate ΔG^ that is calculated in step S7 from acceleration change amount detection ΔG that is calculated in step S6. Therefore, the correction value Gd will assume a positive value in the case of ΔG>ΔG^, whereas in the case of ΔG<ΔG^, a negative value is obtained.

In step S9, the correction amount restriction or limit unit 20 calculates the correction value after the restriction Gdlim (the after-restriction correction value) to limit the magnitude of the correction value Gd calculated at step S8. The calculation of the after-restriction correction value Gdlim uses equation (1) when the correction value Gd is positive, and uses equation (2) when the correction value Gd is negative.

$$Gdlim = \min(Gd - Gdlimn-1, Gdlv) + Gdlimn-1 \quad (1)$$

$$Gdlim = \max(Gd - Gdlimn-1, -Gdlv) + Gdlimn-1 \quad (2)$$

Here, the Gdlimn−1 is a previous value of the after-restriction correction value Gdlim [g] (the after-restriction correction value Gdlim calculated at completion of the previous neutral control), Gdlv is a limit value set in advance (acceleration [g] corresponding to a road surface gradient of 2%).

In step S10, in zero point correction unit 21, an acceleration detection value G is calculated by adding the after-restriction correction value Gdlim to the G sensor signal Gsen-f after passing through filter 13, thereby correcting the drift error of G sensor signal Gsen. Note that if control advances to this step from step S9, an acceleration detection value G is calculated by using the stored, after-restriction correction value Gdlim calculated in step S9, and updates the stored, after-restriction correction value Gdlim. On the other hand, if control proceeds to this step from step S2, an acceleration detection G is calculated using the stored, after-restriction correction value Gdlim.

In step S11, in the zero point correction unit 21, the after-restriction correction value Gdlim is reset (to zero) and control returns.

Zero point correction operation due to acceleration change amount at the vehicle rollback is now described.

When the driver releases the foot from brake pedal during execution of the neutral control on a sloping road, the vehicle rolls back until a starting clutch of automatic transmission 2 starts to engage. In the acceleration detection device 12 in the first embodiment, by making use of this acceleration change occurring due to this rollback, a drift error of G sensor signal Gsen is corrected. More specifically, by calculating both the acceleration change amount detection ΔG based on a change in G sensor signal Gsen (N control entry acceleration Gin–N control exit acceleration Gout) and the acceleration amount change estimate ΔĜ estimated by G sensor signal Gsen at the stationary vehicle, based on the difference of the two, a correction value Gd is calculated to correct the drift error of G sensor signal Gsen to thereby performing a zero point correction on G sensor signal Gsen.

If there is a drift error in G sensor signal with changes in time and temperature, the N control entry acceleration Gin that is calculated based on G sensor signal Gsen deviates from a true value (an actual acceleration) by a drift error. On the other hand, the acceleration change amount detection ΔG representative of a difference between the N control entry acceleration Gin and N control exit acceleration Gout is not affected by the drift error (i.e., not including drift error). Thus, by taking the difference between acceleration change detection amount detection ΔG and acceleration change amount estimate ΔĜ, the correction value Gd for canceling the drift error of G sensor signal Gsen may be obtained with accuracy and more accurate zero point correction may be realized.

Inhibitory operation of correction amount at zero point correction is described below.

Figure 4:
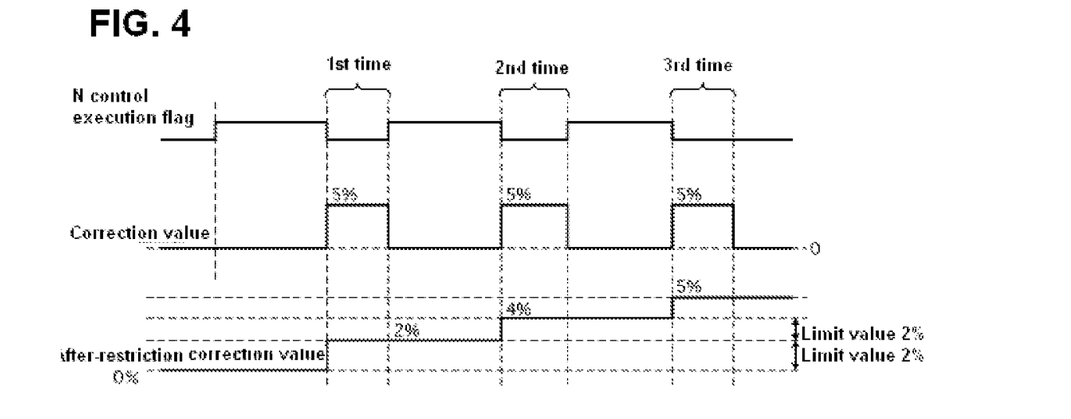
FIG. 4 is a time chart depicting an inhibitory operation of correction amount at the time of zero point correction in the first embodiment.

FIG. 4 is a time chart depicting the inhibitory operation of correction amount at the time of zero point correction in the first embodiment. A neutral control execution flag is a flag that is set in a state in which the neutral control execution condition is satisfied. Correction amount restriction unit 20 limits or restricts the increase amount from the previous value Gdlimn–1 at the time of zero point correction to a limit value Gdlv (acceleration corresponding to a 2% gradient) or below when the after-restriction correction value Gdlim is positive. When the after-restriction value Gdlim is negative, the reduction amount compared to the previous value Gdlimn–1 will be limited to the limit value –Gdlv or more.

Therefore, as shown in FIG. 4, when the neutral control has been executed three times immediately after ignition switch being turned ON and each correction value Gd corresponds to an acceleration equivalent to 5% gradient, then the after-restriction correction values Gdlim for the first and second time of zero point of correction are limited to 2% and 4% gradients respectively, and the after-restriction value Gdlim at the third time of zero point correction becomes to be the same acceleration as the correction value Gd corresponding to 5% gradient.

Inhibitory action of erroneous correction due to vehicle vibration is now described.

Figure 5:
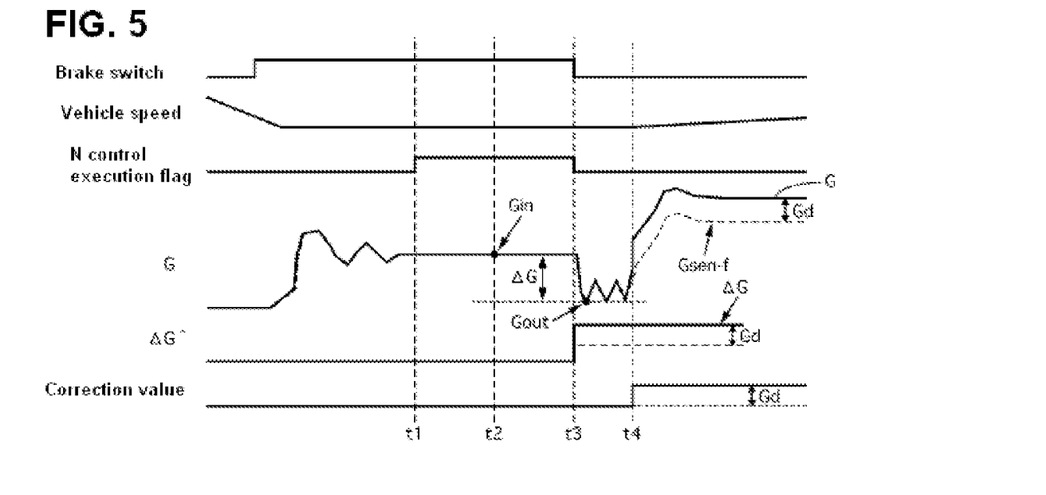
FIG. 5 is a time chart depicting the logic of erroneous correction occurrence at the time of zero point correction in the conventional technology.

FIG. 5 is a time chart depicting the logic of erroneous correction occurrence at the time of a zero point correction in the conventional technology. It is assumed that the vehicle is stopped on an uphill road.

At time t1, the neutral control execution condition is satisfied, and neutral control is started.

At time t2, based on the G sensor signal Gsen-f after passing through the filter 13 after the predetermined time has elapsed from the start of the neutral control, the N control entry acceleration Gin is calculated.

At time t3, because the driver releases the foot from the brake pedal to exit the neutral control, and for a period between the time t3 and up to t4, a rollback of the vehicle occurs.

At time t4, out of G sensor Gsen-f signal after having passed through the filter 13, such a G sensor signal Gsen-f is identified as a N control exit acceleration Gout, that is positioned the farthest from the N control entry acceleration to obtain both acceleration change amount detection ΔG and acceleration change amount estimate ΔĜ. Correction value Gd is then calculated from the difference between the two, and thereafter and for the time period until the next neutral control will end, a gradient determination will be made for neutral control using the acceleration detection value G that was corrected for drift error by that correction value Gd.

Here, during a period from time t3 to time t4, when the vehicle rolls back and the vehicle body vibrates, the vibration components in the vehicle longitudinal direction is included in the G sensor signal Gsen-f that passes through filter 13. Note that as the factor of vehicle vibration, such situations may be considered in which vehicle wheel passes the uneven road surface such as a rut, when the road surface is vibrated such as on an elevated bridge and the like, or the occupant moves in the vehicle. If the oscillating amplitude of that vehicle body vibration component, the G sensor signal Gsen-f after passing through filter 13 may oscillates as shown in FIG. 5, and when out of the peak points, such a peak point with the remotest distance from the N control entry acceleration Gin is selected as the N control exit acceleration Gout. Then the acceleration change amount detection ΔG (=Gin–Gout) becomes smaller than the value detected by the rollback of the vehicle with the result that an excessive correction value Gd (=ΔG–ΔĜ) is calculated. Consequently, for the time period after the time t4, since the acceleration detection value G will be corrected smaller than the acceleration corresponding to the actual gradient of road surface, even a flat road may be erroneously determined as a sloping road with over 5% gradient, and the neutral control may not be allowed with associated deterioration in fuel consumption.

Figure 6:
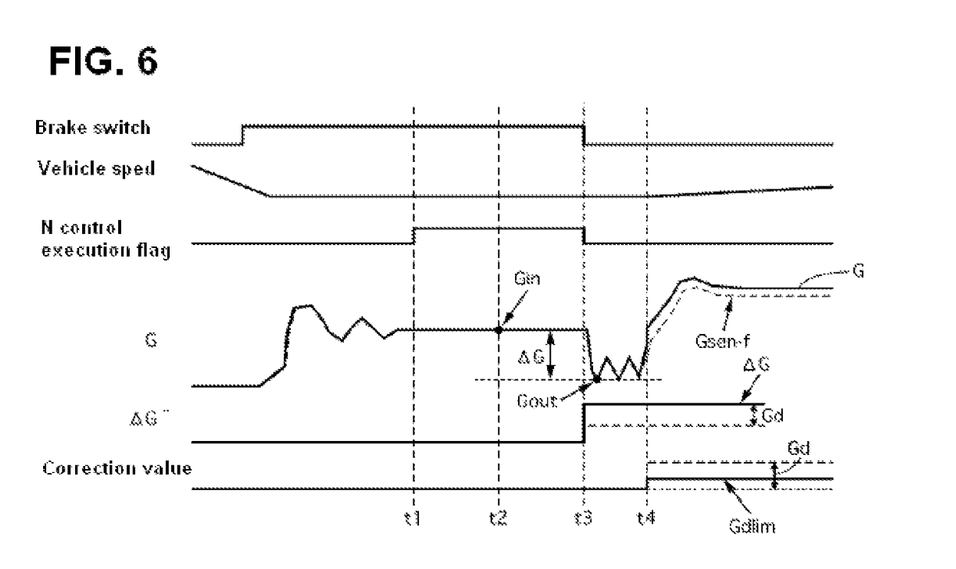
FIG. 6 is a time chart depicting an inhibitory operation of erroneous correction in the first embodiment.

In contrast, in the first embodiment, as shown in FIG. 6, since the correction value Gd is limited or restricted by the after-restriction correction value Gdlim, and thus the correction amount (absolute value of correction value Gd) per one time is limited to the limit value Gdlv (acceleration corresponding to 2% gradient) or less, even if the above described peak value stemming from the vehicle body vibration component is selected as the N control exit acceleration Gout, calculation of excessive correction amount is suppressed and such a situation is avoided in which the acceleration detection value G is corrected unduly smaller than the acceleration corresponding to the actual road surface slope.

Further, since the amount of change in correction amount per one time is limited, by implementing several times of zero point correction, while suppressing the calculation of an excessive correction amount, the correction amount may gradually approach the actual drift error so that the deviation of the detected acceleration value G from the true value may be inhibited. For example, in FIG. 4, assuming that the acceleration drift error corresponds to an actual gradient of 5%, after the zero point correction operations of the first and second time, at the time of correcting the zero point of the third time, the correction may be set to correspond to a 5% gradient slope.

In the first embodiment, when an ignition switch has been turned OFF, the after-restriction correction value Gdlim is reset (to zero). Generally, for the time period from the time at which ignition switch has been turned OFF to the time of turning ON, because the ambient temperature of the G sensor 9 is changed, the drift error of G sensor signal Gsen also changes. Assuming that the after-restriction correction value Gdlim would not be reset, during a period up to execution of neutral control, there is a possibility that G sensor signal Gsen would be corrected by the after-restriction signal separated from the actual drift error. Thus, by resetting the after-restriction correction value Gdlim each time the ignition switch is turned OFF, an erroneous correction of G sensor signal Gsen will be suppressed during the next travel.

The acceleration detection device 12 of the first embodiment has the effects listed below.

(1) The acceleration detection device 12 is provided with a zero point correction unit 21 that corrects a zero point position of sensor signal Gsen by a correction amount (the absolute value of correction value Gd) based on a N control exit acceleration Gout at the transition from a vehicle stationary state to the running state, and a correction amount restriction unit 20 that limits the correction amount.

Therefore, a calculation of excessive correction amount due to vehicle body vibrations attributable to road surface irregularities, road surface vibrations, movement of occupant and the like, and the acceleration detection value G is prevented from being corrected excessively small as compared to the actual road surface slope.

(2) The correction amount restriction or limiting unit 20 limits the change amount from the previous correction value, and the amount of change per one time is also limited. Therefore, by implementing the zero correction several times, the correction amount can be brought close to the actual drift error gradually while suppressing calculation of the excessive correction amount so that the deviation of acceleration detection value G from the true value may be inhibited.

The second embodiment is different from the first embodiment in the calculation method of the after-restriction correction value Gdlim.

Figure 7:
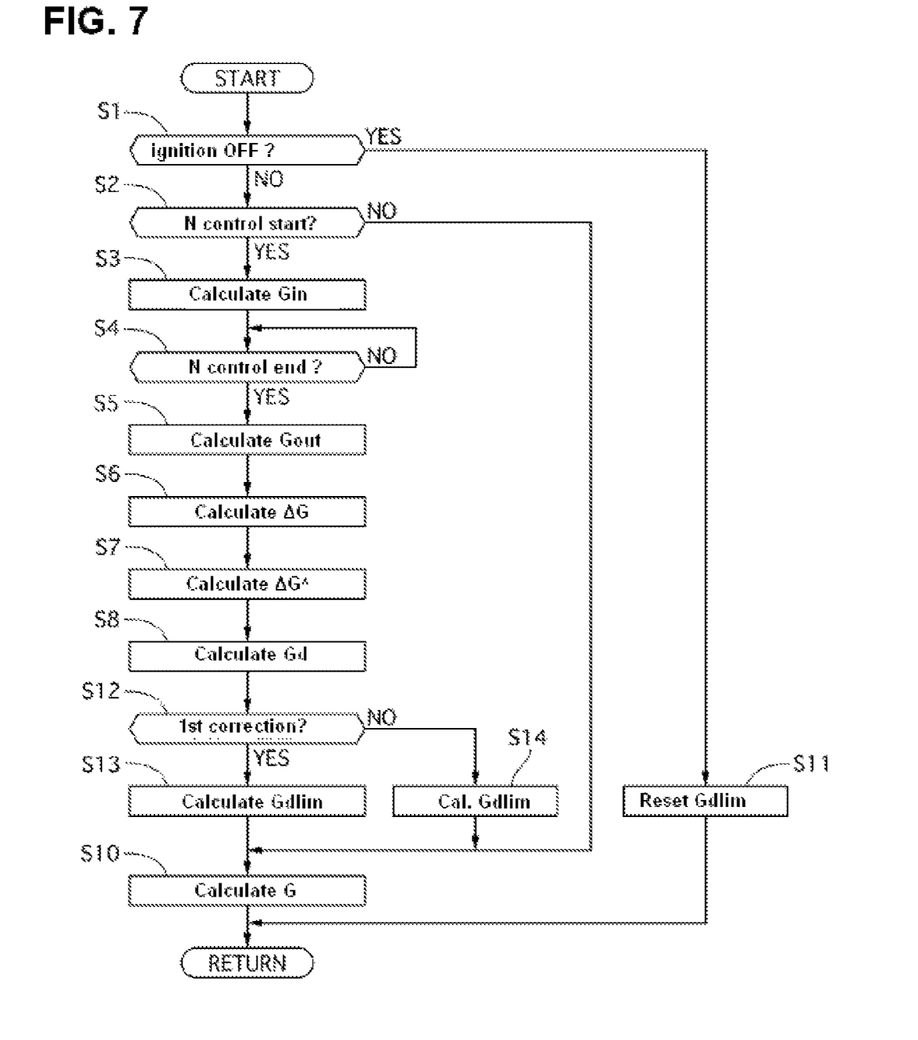
FIG. 7 is a flowchart depicting a flow of acceleration detection process executed by the acceleration detection device 12 of a second embodiment.

FIG. 7 is a flowchart depicting a flow of an acceleration detection process executed by the acceleration detection device 12 of the second embodiment. Now, description is made of each step. Note that, by attaching the same step number to those performing the same process as the first embodiment, the duplicate description is omitted. In step S12, the correction amount limiting unit 20 determines whether or not the zero point correction is for that immediately after the ignition switch is ON, and if YES, the process proceeds to step S13, while, if NO, the process proceeds to step S14.

In step S13, the correction amount restriction or limiting unit 20 calculates an after-restriction correction value Gdlim to limit the magnitude of the correction value Gd calculated at step S8. Using equation (3) below, the calculation of the correction value Gdlim may be made when the correction value Gd is positive, while use is made of equation (4) if the correction value Gd is negative.

$$Gdlim = min(Gd - Gdlimn-1, Gdlv-1) + Gdlimn-1 \quad (3)$$

$$Gdlim = max(Gd - Gdlimn-1, -Gdlv-1) + Gdlimn-1 \quad (4)$$

Here, the Gdlv−1 denotes a preset limit value and corresponds to an acceleration [g] corresponding to the road surface gradient 5%).

In Step S14, the correction amount restriction or limiting unit 20 calculates the after-correction correction value that limits or restricts the correction value Gd calculated in step S8. Using equation (5) below, the calculation of the correction value Gdlim may be made when the correction value Gd is positive, while use is made of equation (6) when the correction value Gd is negative.

$$Gdlim = min(Gd - Gdlimn-1, Gdlv-2) + Gdlimn-1 \quad (5)$$

$$Gdlim = max(Gd - Gdlimn-1, -Gdlv-2) + Gdlimn-1 \quad (6)$$

Here, the Gdlv−2 denotes a preset limit value smaller than Gdlv−1, and corresponds to an acceleration of the road surface gradient of 1%).

Figure 8:
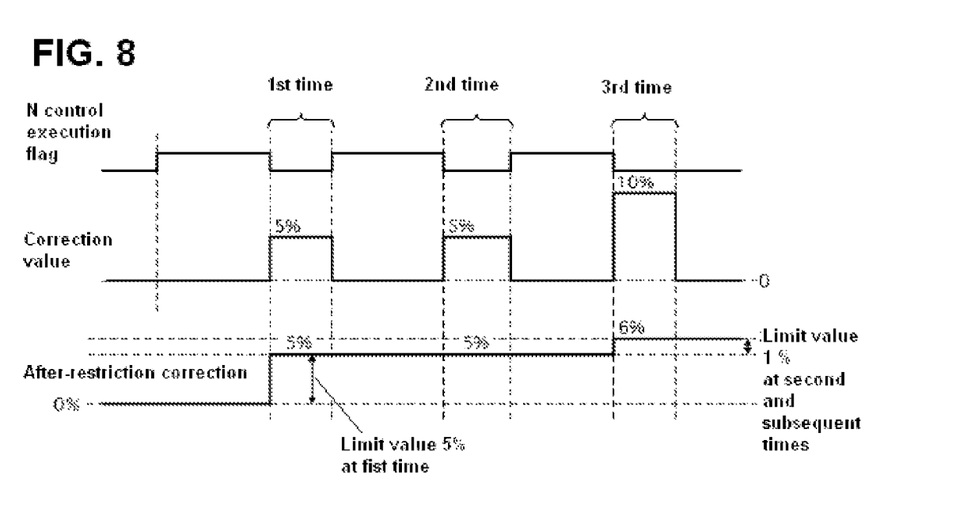
FIG. 8 is a time chart depicting an inhibitory operation of a correction amount at the time of zero point correction in the second embodiment.

Now description is made of the effects. FIG. 8 is a time chart depicting the inhibitory operation of correction amount at the time of the zero point correction in the second embodiment.

The correction restriction or limiting unit 20 limits or restricts, when the after-restriction correction value Gdlim is positive, the increase amount from the previous value Ddlim n−1 at the zero point correction immediately after ignition switch being ON. More specifically the correction restriction unit 20 limits the increase amounts to Gdlv−1 (acceleration corresponding to 5% gradient) at first time of correction and limits to the limit value Gdlv−2 (acceleration corresponding to 1% gradient) at the second and subsequent times.

Therefore, as shown in FIG. 8, when a drift error is occurring corresponding to the acceleration of 5% gradient immediately following ignition switch being turned ON, the correction amount at the first time of zero point correction may be made to the same as the drift error. Therefore, the drift error may be corrected promptly.

At the second and subsequent times of zero point corrections, when such G sensor signal Gsen is selected as the N control exit acceleration Gout, that includes a vehicle body vibration component due to road surface irregularities or movement of the occupant, the increase amount of the correction amount from the previous value Gdlim n−1 will be restricted to an acceleration that corresponds to 1% gradient or less. Thus, calculation of excessive correction amount will be suppressed and such a situation will be inhibited in which the acceleration detection G will be excessively small as compared to the acceleration corresponding to the actual road surface gradient.

In the acceleration detection device 12 of the second embodiment, in addition to the effects of (1) and (2), the following effect may be achieved.

(3) The zero point correction unit 21 executes a zero point correction, during a period between the time at which ignition switch is turned ON and the time of turning OFF, each time the vehicle stops with the driving force transmission to driving wheels being disconnected, and the correction restriction or limiting unit 20 restricts on the correction amount at the initial correction smaller or less restrictive compared to that at the time of subsequent corrections. In this way, the earlier resolution of drift error due to temperature changes is made compatible with suppression of calculation of excessive correction amount due to vehicle body vibrations at the end of neutral control.

The third embodiment differs from the first embodiment in the calculation method of correction value Gd.

Figure 9:
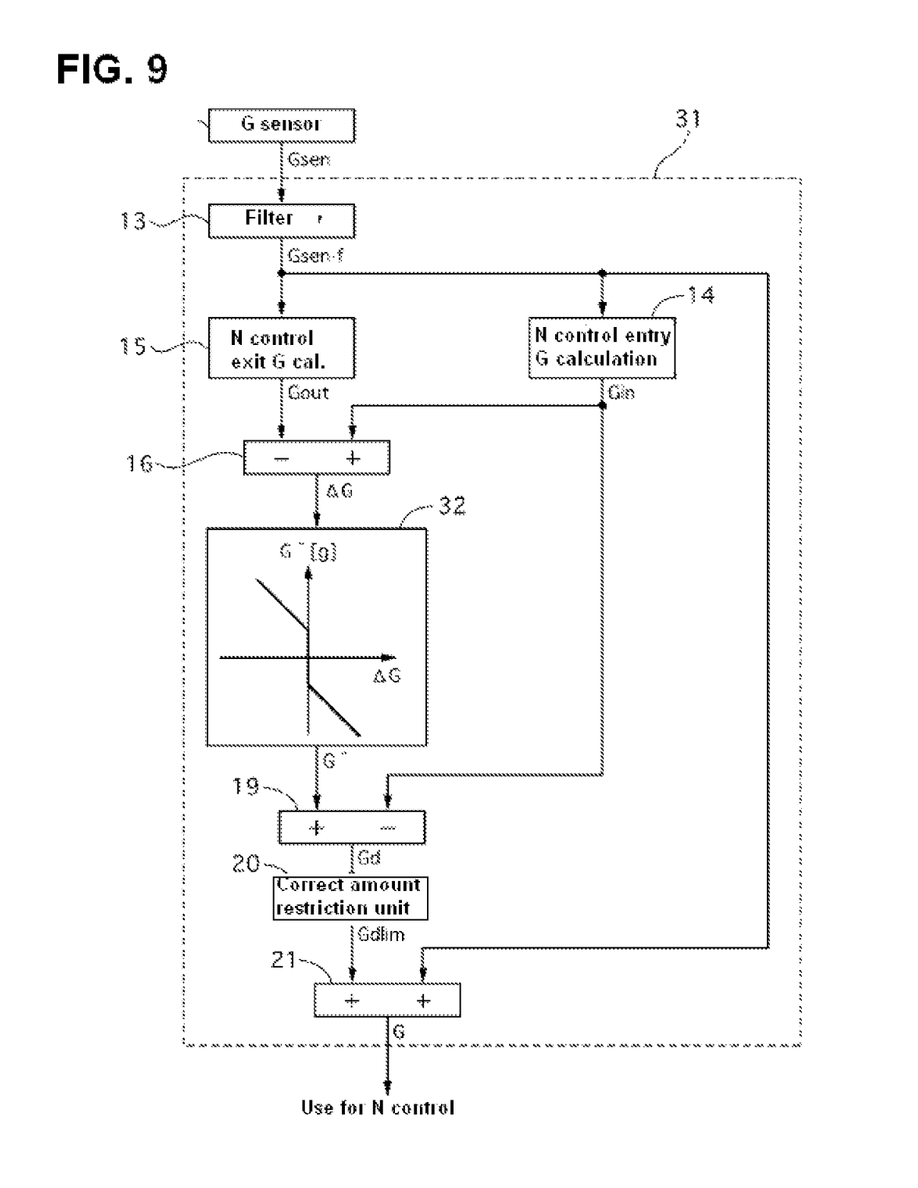
FIG. 9 is a control block diagram depicting a configuration of the acceleration detection device 31 housed in ECU 4 of the third embodiment.

FIG. 9 is a control block diagram depicting a configuration of the acceleration detection device 21 incorporated in ECU 4 of the third embodiment. The acceleration detection device of the third embodiment 3 is provided with a filter 13, N control entry G calculation unit 14, N control exit G calculation unit 15, ΔG calculation unit 16, acceleration estimation unit 32, correction value calculation unit 19, correction restriction unit 20, and zero point correction unit 21.

The acceleration estimation unit 32 calculates an acceleration estimate value G^ [g] based on the acceleration change amount detection ΔG calculated from ΔG calculation unit 16 and with reference to a map for a gradient equivalent acceleration calculation with respect to acceleration change amount (acceleration change amount–gradient equivalent acceleration calculation map). The relationship between the acceleration change amount of vehicle due to a vehicle rollback at the end of N control and road surface gradient is the same for the same vehicle, and the road surface gradient may be converted to an acceleration, the map of acceleration change amount-gradient equivalent acceleration calculation may be obtained in advance through experiments and the like.

Figure 10:
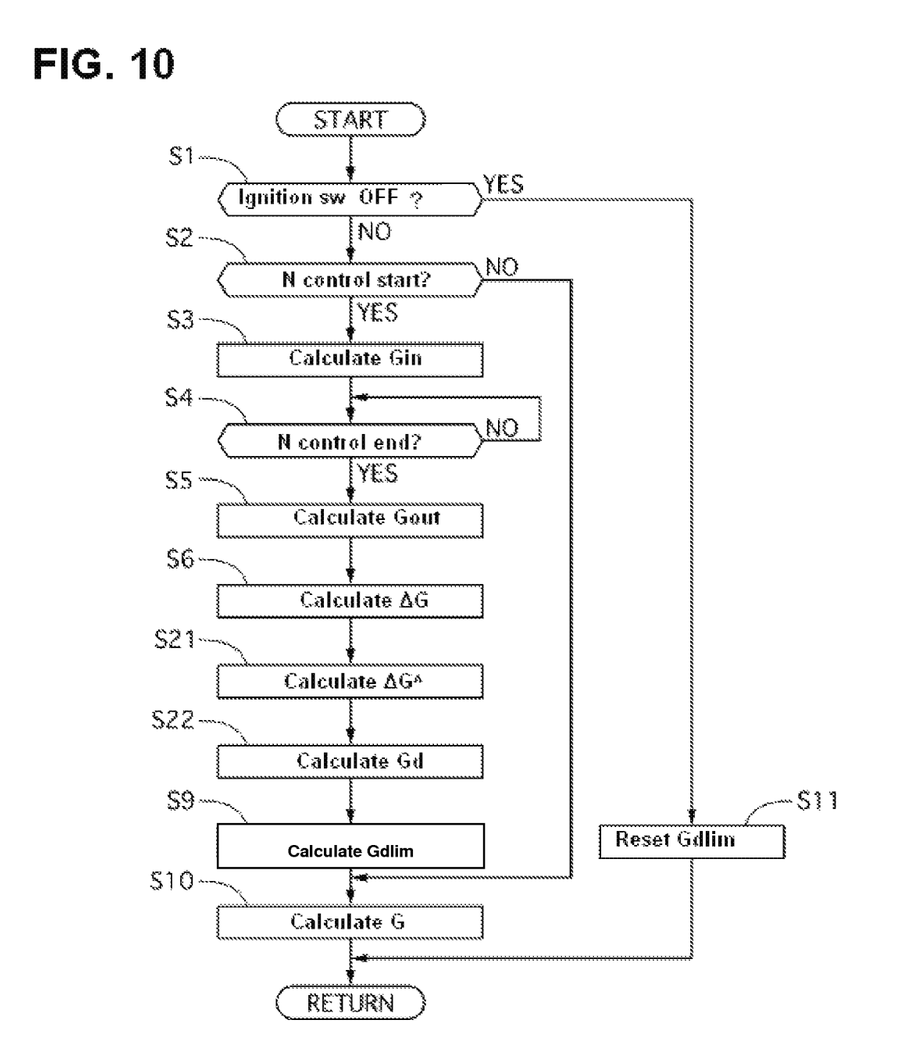
FIG. 10 is a flowchart depicting a flow of acceleration detection process executed by the acceleration detection device 31 of the third embodiment.

FIG. 10 is a flow chart depicting a flow of processing to be executed by the acceleration detection process executable by acceleration detection device 31 of the third embodiment. Now, description is made of each step. To those steps performing the same process as in the first embodiment shown in FIG. 1, the same step numbers are attached and the duplicate of description thereof is thus omitted.

In step S21, acceleration estimation unit 32 calculates an acceleration estimate value G^[g] based on the acceleration change amount detection ΔG calculated in step S6 and by referring to the acceleration change amount-gradient equivalent acceleration calculation map.

In step S22, the correction value calculation unit 19 calculates a correction value Gd [g] by subtracting the N control entry acceleration Gin calculated in step S3 from the acceleration estimate G^ calculated in step S21.

Zero point correction operation based on acceleration change amount at the time of rollback of the vehicle is now described.

The acceleration detection device 31 of the third embodiment calculates a correction value Gd for correcting a drift error of G sensor signal Gsen based on a difference between the acceleration estimate G^ derivable from change in G sensor signal Gsen (i.e. N control entry acceleration Gin–N control exit acceleration Gout) and the N control entry acceleration Gin in order to perform zero point correction of G sensor signal.

When a drift error in G sensor signal is occurring due to temperature change or aging, the N control entry acceleration Gin calculated based on G sensor signal deviates from the true value by the drift error. On the other hand, the acceleration estimate G^ that is calculated from the difference between the N control entry acceleration Gin and the N control exit acceleration Gout is free from influence of the drift error (i.e. does not include the drift error). Thus, by taking the difference between the acceleration estimate G^ and the N control entry acceleration Gin, a correction value that cancels the drift error in G sensor signal Gsen may be obtained with accuracy so that even more accurate correction of zero point will be achieved.

Therefore, in the acceleration detection device 31 of the third embodiment exhibits, the same effects as in the first embodiment are achieved.

Although the configuration for carrying out the present invention has been described above with reference to embodiments, the specific configurations of the present invention is not limited to these embodiments, design changes and the like without departing from the gist of the present invention may be included within the present invention.

For example, the method for calculating the after-restriction correction value Gdlim in the second embodiment may be applied to the third embodiment.

The correction method of acceleration detection value G according to the present invention may not be limited to the application at completion of neutral control, but equally applicable at the time of an idle stop control with the similar effects as in the embodiments.

The invention claimed is:

1. An acceleration detection device, comprising:
   a neutral control entry calculation unit that calculates an entry acceleration after a predetermined time has elapsed from a start of neutral control;
   a neutral control exit calculation unit that calculates an exit acceleration from an end of the neutral control to a starting clutch engagement;
   a neutral control change calculation unit that calculates an acceleration change by subtracting the exit acceleration from the entry acceleration;
   an acceleration changes estimating unit that estimates a change in acceleration based on a road surface gradient calculated from the entry acceleration and a gradient-acceleration map;
   a correction amount calculation unit that calculates a correction amount by subtracting the estimated change in acceleration from the calculated acceleration change calculated by the neutral control change calculation unit;
   a correction amount restriction unit that calculates a restricted correction amount to limit a magnitude of the correction amount based on a previously determined restricted correction amount and a preset limit value; and
   a zero point correction unit that corrects a zero point position of an acceleration sensor signal by adding the restricted correction amount to the zero point position based on an acceleration sensor signal after neutral control at transition from a vehicle stationary state to the running state, wherein the restricted correction amount is reset to zero after the zero point position is corrected.

2. The acceleration detection device claimed in claim 1, wherein the correction amount restriction unit calculates the restricted correction amount to have a smaller absolute value than the previously determined restricted correction amount.

3. The acceleration detection device claimed in claim 1, wherein the zero point correction unit repeatedly executes a zero point correction during a period between a time at which an ignition switch is turned ON and a time at which the ignition switch is turned OFF, the zero point correction unit correcting the zero point position based on a stored correction value if neutral control is not performed.

4. The acceleration detection device claimed in claim 1, wherein the zero point correction unit executes a zero point correction each time a driving force transmission to driving wheels is disconnected.

5. The acceleration detection device claimed in claim 1, wherein the correction amount restriction unit calculates a greater restricted correction amount at a first time of correction and calculates a smaller restricted correction amount at second and subsequent times of correction.

6. The acceleration detection device claimed in claim 1, wherein the predetermined time from the start of neutral control is a time in which vehicle vibration generated during a stopping operation is sufficiently ended.

* * * * *